US006655905B1

(12) United States Patent
Staehlin

(10) Patent No.: US 6,655,905 B1
(45) Date of Patent: Dec. 2, 2003

(54) LINEAR TRANSLATION DEVICE

(75) Inventor: John H. Staehlin, Timonium, MD (US)

(73) Assignee: Volunteers for Medical Engineering, Baltimore, MD (US)

( * ) Notice: Subject to any disclaimer, the term of this patent is extended or adjusted under 35 U.S.C. 154(b) by 0 days.

(21) Appl. No.: 10/160,007

(22) Filed: Jun. 4, 2002

(51) Int. Cl.$^{7}$ ................................................ B65G 49/07
(52) U.S. Cl. ........................ 414/921; 198/630; 187/200
(58) Field of Search .......................... 198/630; 414/921, 414/546, 540, 917, 541, 545, 663; 5/81.1 R, 87.1, 84.1; 187/200, 901, 244, 284, 291, 222, 239, 203

(56) References Cited

U.S. PATENT DOCUMENTS 4,339,224 A * 7/1982 Lamb ......................... 414/501
5,357,869 A * 10/1994 Barjolle et al. ............. 105/436
5,375,910 A * 12/1994 Murphy ................. 297/256.13
5,595,265 A * 1/1997 Lebrocquy .................. 187/261
5,651,149 A * 7/1997 Garman ..................... 5/81.1 R
5,891,065 A * 4/1999 Cariapa et al. ............. 601/152
6,190,112 B1 * 2/2001 Danilovic ................... 414/541
6,398,479 B1 * 6/2002 Dupuy et al. ............... 414/540
6,419,050 B1 * 7/2002 Sardonico .................... 187/244
6,435,804 B1 * 8/2002 Hutchins ..................... 414/540
6,461,097 B1 * 10/2002 Ablabutyan et al. ......... 414/546

* cited by examiner

*Primary Examiner*—Christopher P. Ellis
*Assistant Examiner*—Rashmi Sharma
(74) *Attorney, Agent, or Firm*—Finnegan, Henderson, Farabow, Garrett & Dunner, L.L.P.

(57) ABSTRACT

A linear translation thrust system for moving an object from one location to another that includes at least two platforms and pivotally connected members. The distance between one platform and the second is varied by inflating and deflating an inflatable bladder. The linear translation thrust system may also include a conduit for coupling the exhaust system of a vehicle to the interior of the bladder so that the exhaust pressure of the vehicle inflates the bladder.

20 Claims, 6 Drawing Sheets

LINEAR TRANSLATION DEVICE

BACKGROUND OF THE INVENTION

1. Field of the Invention

The present invention generally relates to a device for providing linear translation of one platform relative to a second platform. More particularly, the invention relates to a device for the lifting and lowering of people in wheelchairs to allow entry into and egress from a vehicle.

2. Description of Related Art

Physically disabled individuals using a wheelchair rely on many different types of mechanical devices to perform routine tasks. For example, a powered lift is often required in order to move such an individual to and from the interior of a vehicle. Conventional wheelchair lifts require extensive modifications to a vehicle in order to attach the lift device to the vehicle. Some of these modifications cause normal vehicle entry and exit to be blocked while the wheelchair lift is in use.

There is a public need for a low profile and low pressure actuated wheelchair lift that does not require extensive vehicle modifications or block vehicle doors. Ideally a wheelchair lift should have a footprint just larger than that which is required to encompass the footprint created by the wheelchair. Most power devices for actuating a lift mechanism requires the use of high pressure piston driven devices or heavy electrical motors and gear boxes with commensurate heavy articulating structural members.

It is an object of this invention to provide a lightweight lift mechanism requiring very low pressures for the actuation and lifting force.

It is a further object of the invention to provide a constant translation or lifting force for a given low pressure input fluid.

It is still further object of the invention to provide a lift that travels a straight line path between the lift platform and the bottom platform and has a high aspect ratio (greater than 3 to 1) between the stowed height of the device and the deployed height of the device.

U.S. Pat. No. 3,843,092 and U.S. Pat. No. 3,730,366, for example, disclose lifting structures that could be used to lift a wheelchair. However, these and other conventional lifting structures have some disadvantages and limitations, namely their large footprint and cost. Most lift mechanisms require high pressure actuators and/or heavy electric motors and gear boxes in order to affect the operation of the lift. The mechanism members are necessarily high strength and heavy in order to withstand these high pressures and associated forces. Thus, the weight of the finished product is also relatively heavy.

In light of the foregoing, there is a need in the art for a lightweight, low profile, low pressure actuated improved lift or translation device.

SUMMARY OF THE INVENTION

Accordingly, the present invention is directed to a device that substantially obviates one or more limitations of the related art. To achieve these and other advantages, and in accordance with the purposes of the invention, as embodied and broadly described herein, the invention includes a linear translation device having a base, a platform above the base, an intermediate platform between the base and the platform, an inflatable bladder between the base and the platform for lifting the platform as the bladder is pressurized, at least one first hinge member and at least one second hinge member. Another aspect of the invention includes a hinged bracket assembly formed of two members.

In an aspect of the invention, the first hinge member has a first end pivotally connected to the base and a second end pivotally connected to the intermediate platform. In addition, the second hinge member has a first end pivotally connected to the platform and a second end pivotally connected to the intermediate platform.

In another aspect of the invention, the hinged bracket assembly comprises a first bracket member pivotally connected to the base at one end and pivotally connected to a second bracket member at the other end. The other end of the second bracket member is pivotally connected to the platform. The pivotal connection between the two bracket members is formed along a hinge axis in a plane substantially perpendicular to hinge axes of the pivotal connections of the first and second hinge members. The bracket hinge axis is in the same plane as the intermediate platform. The intermediate platform has two concave cutouts to provide clearance for the first and second bracket members as they fold inward toward each other during deflation of the inflatable bladder.

In yet another aspect, the lift device includes a second platform, and a second inflatable bladder for moving the second platform away from the platform during inflation of the second inflatable bladder. In one preferred configuration having brackets and hinged members, vertical motion is imparted to the second platform without substantial translation of the second platform. In another preferred configuration having hinge members, the second platform simultaneously translates and elevates.

In still another aspect, the lift device includes a hose for fluid coupling an exhaust system of a vehicle, or similar source of pressurized air, to an interior of the inflatable bladder so that exhaust of the vehicle inflates the bladder.

Additional features, advantages, and objectives of the invention will be set forth in the description that follows, and in part, will be apparent from the description, or may be learned by practice of the invention. The objectives and other advantages of the invention will be realized and attained by means of the elements and combinations particularly pointed out in the written description and claims herein as well as the appended drawings.

It is to be understood that both the foregoing general description and the following detailed description are exemplary and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
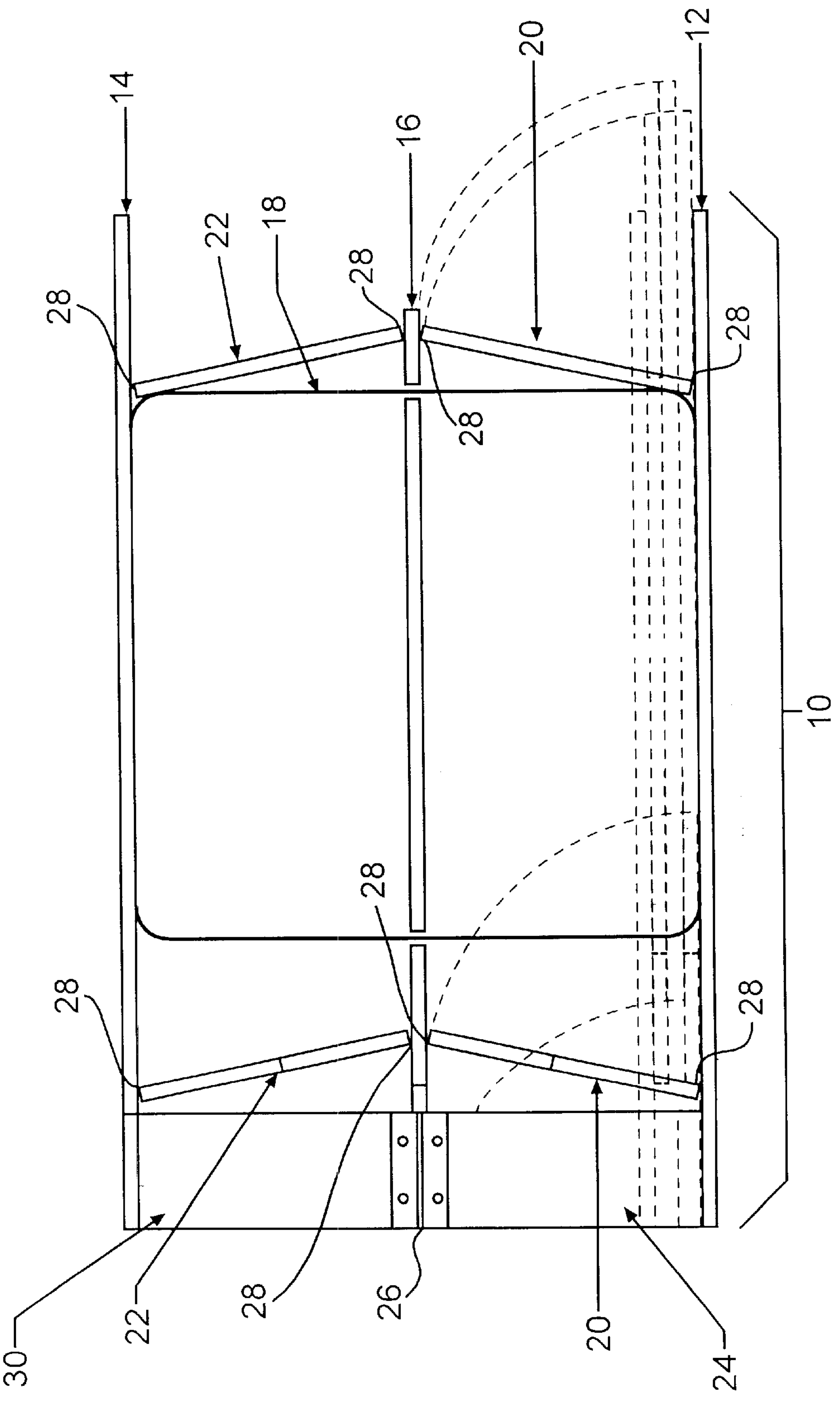
FIG. 1 is a side view of a first embodiment of the linear translation device in the fully elevated position wherein broken lines show movement of the linear translation device to a lowered position.

Reference will now be made in detail to the present preferred embodiments of the invention as illustrated in the accompanying drawings. Whenever possible, the same reference numerals are used in the drawings and the description to refer to the same or like parts.

Figure 2:
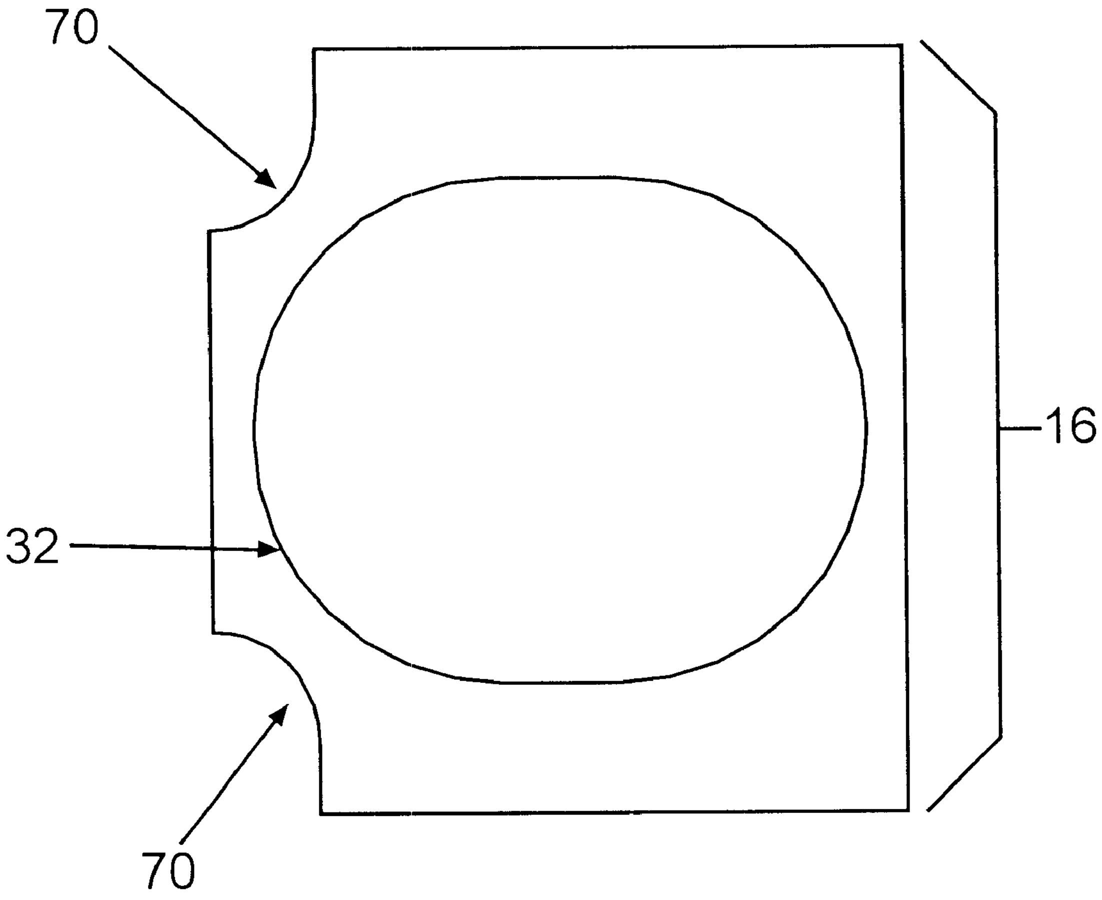
FIG. 2 is a plan view of an intermediate platform shown in FIG. 1.

A preferred embodiment of the linear translation device is shown in FIG. 1, and identified generally by reference numeral 10. The linear translation device 10 includes a base 12 located below and parallel to a platform 14. An intermediate platform 16 is located between base 12 and platform 14. As shown in FIG. 2, the intermediate platform 16 has an opening 32 through which an inflatable bladder 18, shown in FIG. 1, fits. The size and shape of opening 32 may be of any suitable proportions. By way of example only, an oval shape is shown in FIG. 2.

As shown in FIG. 1, the inflatable bladder 18 is located between the base 12 and the platform 14. Inflatable bladder 18 has any suitable shape, but the preferred shape shown in FIG. 1 is cylindrical with flat ends. As the inflatable bladder 18 is inflated, it pushes platform 14 away from base 12 and passes through opening 32, shown in FIG. 2. When the bladder 18 is deflated, it lowers the platform 14 toward the base 12. Objects that are to be raised or lower, such as a wheelchair, are placed on platform 14.

Intermediate platform 16 is attached to base 12 through first hinge members 20. While there may be any number of first hinge members 20, FIG. 1 shows by way of example two first hinge members 20. First hinge members 20 are pivotally connected to intermediate platform 16 and base 12. As inflatable bladder 18 is inflated, the pivotal connections allow intermediate platform 16 to travel both vertically and horizontally relative to base 12. Intermediate platform 16 may have a pair of cutouts 70, shown in FIG. 2, to facilitate storage of the vertical linear translation device 10 in its deflated state.

As shown in FIG. 1, one or more second hinge members 22 have a first end pivotally connected to platform 14 and a second end pivotally connected to intermediate platform 16. Preferably, two of the second hinge members 22 are provided. Hinges preferably provide the pivotal connections between the first hinge members 20 and the intermediate platform 16 and base 12 and between the second hinge members 22 and the intermediate platform 16 and platform 14. The first and second hinge members 20 and 22 allow platform 14 to remain parallel to base 12 and intermediate platform 16 during inflation of inflatable bladder 18. Preferably, first hinge members 20 and second hinge members 22 are shaped in such a way as to allow inflatable bladder 18 to fully inflate without undesired obstruction.

In accordance with another aspect of the present invention, lateral movement of platform 14 relative to base 12 is limited by a first bracket member 24 and a second bracket member 30 shown in FIG. 1. First bracket member 24 is pivotally connected to base 12 and second bracket member 30 is pivotally connected to platform 14. Hinges pivotally connect first bracket member 24 and second bracket member 30 together, and provide the pivotal connections between first bracket member 24 and base 12 and between second bracket member 30 and platform 14. The pivotal connection between the first bracket member 24 and second bracket member 30 has a hinge axis 26 in a plane substantially perpendicular to hinge axes 28 of the pivotal connections of first and second hinge members 20 and 22. In addition, the pivotal connection between the first and second bracket members 24 and 30 is preferably in the same plane as intermediate platform 16.

Preferably, the sum of the length of one of first hinge members 20 and the length of one of the second hinge members 22 connected thereto is greater than a lift distance between base 12 and platform 14 when inflatable bladder 18 is fully inflated. This insures that first hinge member 20 and second hinge member 22 lack colinearity when platform 14 is moved away from base 12 and facilitate the deflation of inflatable bladder 18 by preventing the first hinge member 20 and second hinge member 22 from becoming locked together when the bladder 18 is in an inflated position.

Figure 3:
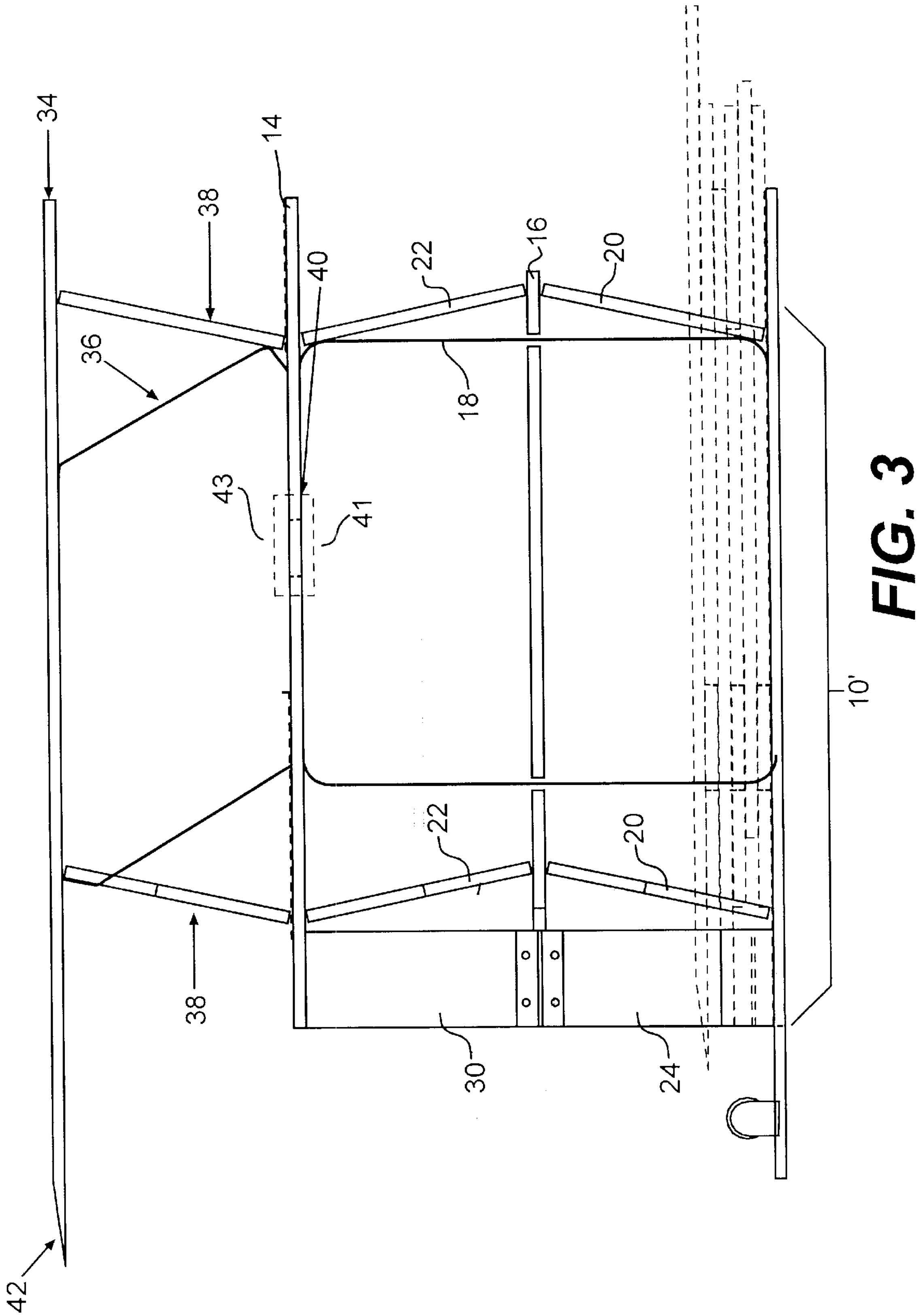
FIG. 3 is a side view of a second embodiment of the linear translation device including a second platform for simultaneous lifting and translation.

FIG. 3 shows a second embodiment of a lift device 10'. Lift device 10' is constructed similar to the lift device 10 shown in FIG. 1 and also includes a second platform 34. Second platform 34 is moved away from platform 14 by a second inflatable bladder 36 located between platform 14 and second platform 34. While second platform 34 can be coupled to platform 14 by any known means, in the preferred embodiment at least two third hinge members 38 provide the coupling between the platform 14 and second platform 34. Third hinge members 38 have a first end pivotally connected to platform 14 and a second end pivotally connected to second platform 34. Hinges preferably provide the pivotal connection of the third hinge member 38.

Second inflatable bladder 36 is constructed similar to inflatable bladder 18 and is inflated via a valve assembly 40 located in platform 14 and providing selective fluid communication between the interiors of the first inflatable bladder 18 and the second inflatable bladder 36. Valve assembly 40 has a first end 41 exposed to the interior of first inflatable bladder 18 and a second end 43 exposed to the interior of second inflatable bladder 36.

Figure 5:
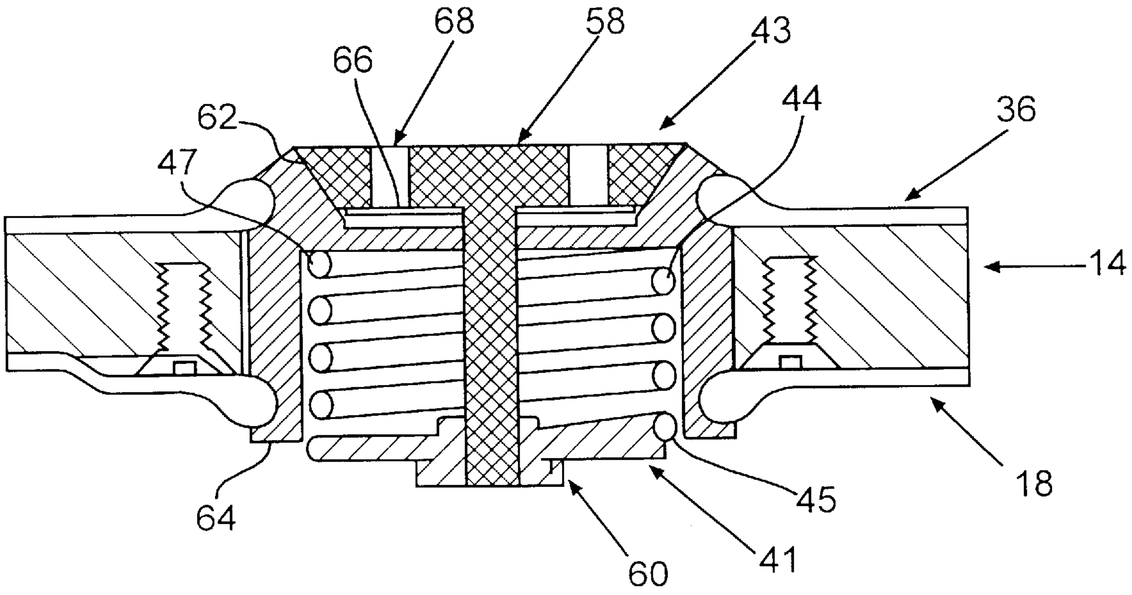
FIG. 5 is a partial cross-sectional detail view of an inflation valve assembly shown in FIG. 3.

As shown in FIG. 5, the second end 43 of valve assembly 40 includes a valve member 58 connected on one side to spring 44. Spring 44 places a pre-load on valve member 58 forcing it to rest on a valve seat 62. Second end 47 of spring 44 pushes against valve body 64. First end 45 of spring 44 is connected to a support washer 60 located at the first end 41 of valve assembly 40. Support washer 60 has an opening that allows fluid from the interior of inflatable bladder 18 to act against valve member 58. Inflation fluid in the lower bladder exerts pressure upon the spring side of valve 58 and spring 44 exerts pressure upon a support washer 60. When the force created by the inflation fluid pressure in the first inflatable bladder exceeds the pre-load force of spring 44, valve 58 lifts from valve seat 62 in valve body 64 and thereby allows fluid to pass from first inflatable bladder 18 to second inflatable bladder 36. During deflation, an exhaust valve 56, shown in FIG. 7, attached to first inflatable bladder 18 is opened thereby releasing fluid from the interior of bladder 18. As the fluid is released the internal pressure of inflatable bladder 18 decreases. When the pressure becomes insufficient to overcome the pre-load force of spring 44, valve member 58 returns to its resting position against valve seat 62. As shown in FIG. 5, the second end 43 of valve assembly 40 also has at least one, preferably two, exhaust passages 68. Exhaust passages 68 have flexible diaphragms 66 covering their openings. The flexible diaphragms 66 are attached at one end to the side of the openings facing the first inflatable bladder 18. In its rest position, the flexible diaphragms 66 cover the openings of exhaust passages 68. When the pressure in the first inflatable bladder 18 becomes less than the pressure in the second inflatable bladder 36, the pressure in the second inflatable bladder forces the non-attached end of flexible diaphragms 68 to move away from the openings of exhaust passages 68. The pressurized fluid in the second bladder 36 then bleeds back through the multiple exhaust passages 68 thereby allowing it to deflate.

In accordance with the present invention, second platform 34, platform 14, and third hinge members 38 preferably form a parallelogram structure. As shown in FIG. 3, the parallelogram structure produces relative translation between the platform 14 and the second platform 34 in a direction perpendicular to the lift direction of second platform 34 during inflation of second inflatable bladder 36. Through this arrangement, second platform 34 is capable of moving laterally towards the interior of a vehicle to facilitate transferring a wheelchair to or from second platform 38 and the vehicle. As shown in FIG. 3, at least one side of the second platform 34 has a wedge shaped ramp 42 to facilitate loading and unloading of objects onto second platform 34.

Figure 4:
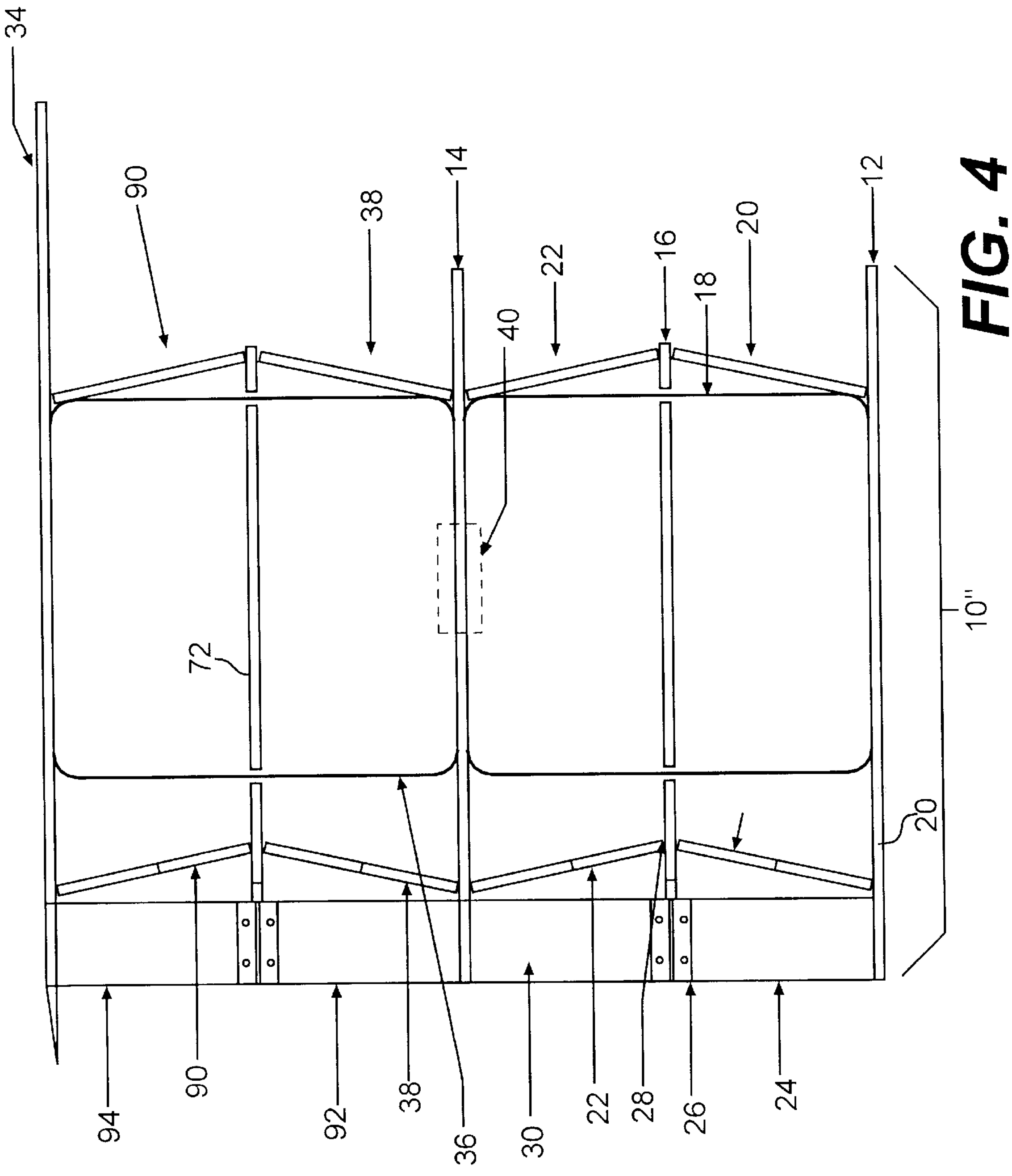
FIG. 4 is a side view of a third embodiment of the linear translation device with a second platform for vertical lifting without substantial translation.

FIG. 4 shows a third embodiment, lift device 10" for vertical lift without substantial lateral translation. Lift device 10" has two main portions, a lower portion similar to linear translation device 10 shown in FIG. 1, and an upper portion including a second intermediate platform 72. In this embodiment, second inflatable bladder 36 passes through an opening, not shown, in second intermediate platform 72 and moves the second platform 34 away from the platform 14 during inflation of second inflatable bladder 36. Second inflatable bladder 36 is connected to inflatable bladder 18 through valve assembly 40. Valve assembly 40 is incorporated into platform 14 in this embodiment and allows for the inflation of second inflatable bladder 36.

As shown in FIG. 4, second intermediate platform 72 is attached to platform 14 through a hinge assembly similar to that connecting the intermediate platform 16 and the base 12 in linear translation device 10 shown in FIG. 1. As second inflatable bladder 36 is inflated, the pivotal connections allow second intermediate platform 72 to travel both vertically and horizontally relative to platform 14. Second platform 34 is attached to second intermediate platform 72 by means of a hinge assembly having fourth hinge members 90 similar to that connecting intermediate platform 16 to platform 14 in linear translation device 10 shown in FIG. 1. Translational motion between second platform 34 and base 12 is avoided by using a bracket assembly having a third bracket member 92 and a fourth bracket member 94 similar to that used to connect base 12 to platform 14 in linear translation device 10 shown in FIG. 1. As compared to the linear translation device 10 shown in FIG. 1, the linear translation device 10" gives the user the ability to reach greater distances with substantially no translational motion between base 12 and second platform 34.

Figure 6:
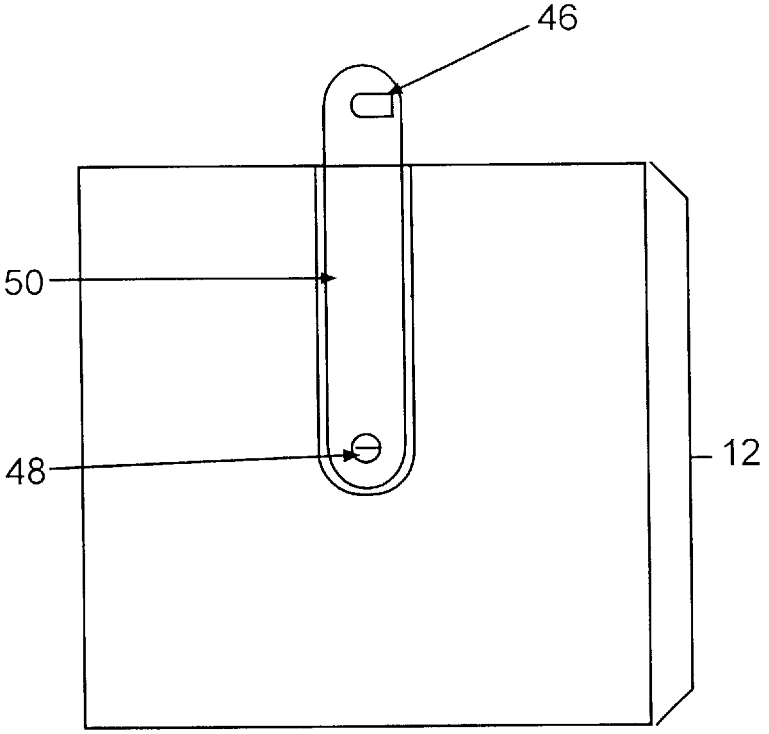
FIG. 6 is a plan view of a base and bladder inflating connector for use with the linear translation device.

As shown in FIG. 6, the base 12 preferably has an inflatable bladder connector 50 for placing the inflatable bladder 18 or the inflatable bladders 18 and 36 in fluid communication with a source of fluid. The connector 50 is preferably embedded in base 12 and has a bladder coupling 48 for flow connection to inflatable bladder 18. Connector 50 also includes a fluid source coupling 46 for providing flow connection to a source of fluid, such as the exhaust source 58, shown in FIG. 7, of a vehicle or the blower output of a shop vacuum, for inflating inflatable bladder 18 and optional second inflatable bladder 36.

Figure 7:
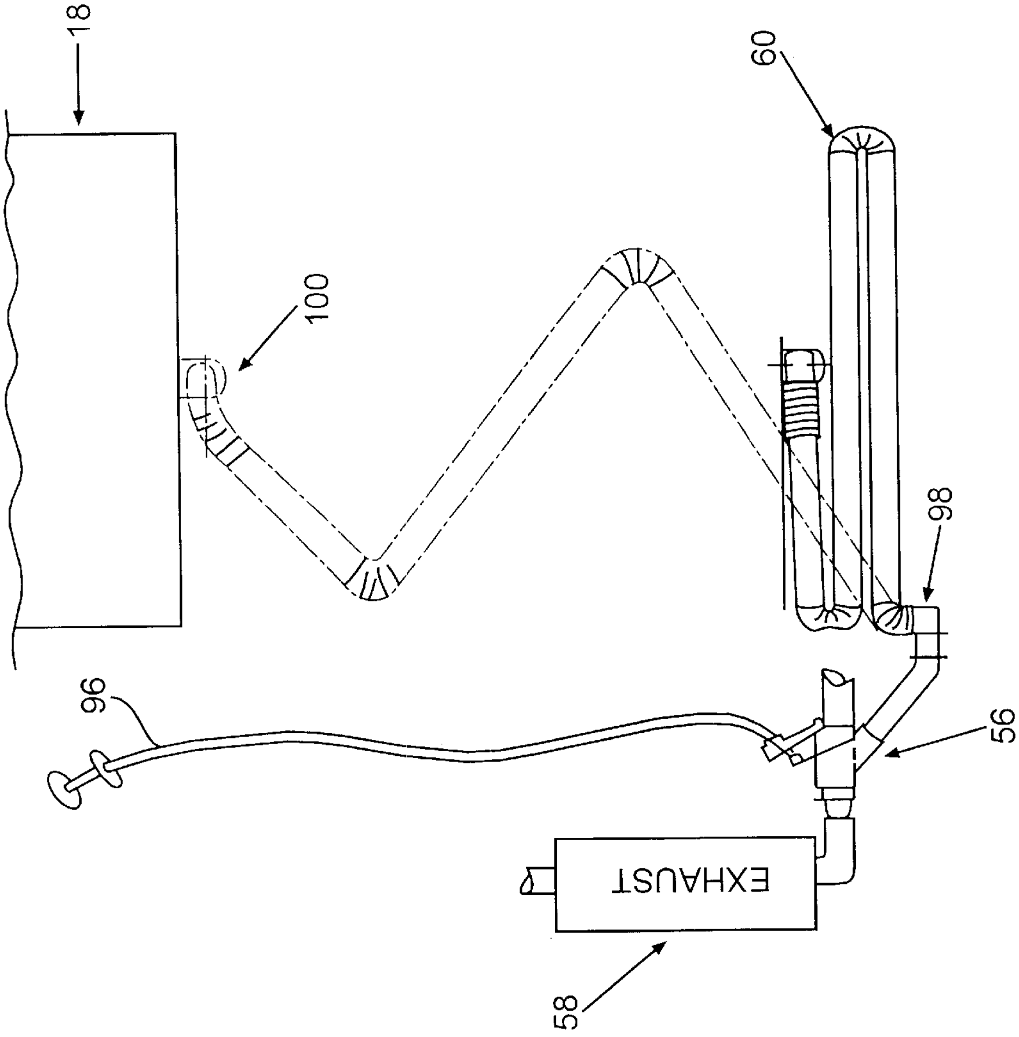
FIG. 7 is a top view of an exhaust system coupling for the linear translation device.

FIG. 7 shows one possible manner by which a vehicle's exhaust can be used to inflate bladder 18 and optional second inflatable bladder 36. Bladder inflating hose 60, shown in FIG. 7, has a first end connected to exhaust valve 56 and a second end connected either directly to inflatable bladder 18, or to fluid source connector 46, shown in FIG. 6. Exhaust valve 56 is connected to an exhaust source 58 and is operated by a switch, such as a Bowden cable 96 shown in FIG. 7, capable of directing the exhaust fluid into inflatable bladder 18 as desired.

Those skilled in the art will appreciate that modifications may be made to the structure of the invention without departing from its scope or spirit. In view of the foregoing, it is intended that the present invention cover modifications and variations of the invention provided they fall within the scope of the following claims and their equivalents.

What is claimed is:

1. A linear translation device comprising:

a base;

a platform above the base;

an intermediate platform between the base and the platform, the intermediate platform having an opening;

an inflatable bladder between the base and the platform, the inflatable bladder passing through the opening in the intermediate platform for moving the platform away from the base during inflation of the inflatable bladder;

at least one first hinge member having a first end pivotally connected to the base and a second end pivotally connected to the intermediate platform;

at least one second hinge member having a first end pivotally connected to the platform and a second end pivotally connected to the intermediate platform.

2. The linear translation device of claim 1, wherein the sum of the length of the first hinge member and the length of the second hinge member is greater than the distance between the base and the platform when the inflatable bladder is fully inflated, so that the first and second hinge members lack colinearity when the platform is moved away from the base.

3. The linear translation device of claim 1, further comprising:

a first bracket member having a first end pivotally connected to the base; and a second bracket member having a first end pivotally connected to the platform and a second end pivotally connected to a second end of the first bracket member along a bracket hinge axis in a plane substantially perpendicular to hinge axes of the pivotal connections of the first and second hinge members, the bracket hinge axis being in the same plane as the intermediate platform.

4. The linear translation device of claim 3, wherein the base, the platform, and the intermediate platform are parallel to each other.

5. The linear translation device of claim 3, wherein the first hinge member and the second hinge member have the same length.

6. The linear translation device of claim 3, wherein the sum of the length of the first hinge member and the length of the second hinge member is greater than the distance between the base and the platform when the inflatable bladder is fully inflated, so that the first and second hinge members lack colinearity when the platform is moved away from the base.

7. The linear translation device of claim 4, wherein the first hinge member and the second hinge member have the same length.

8. The linear translation device of claim 7, wherein the sum of the length of the first hinge member and the length of the second hinge member is greater than the distance between the base and the platform when the inflatable bladder is fully inflated, so that the first and second hinge members lack colinearity when the platform is moved away from the base.

9. The linear translation device of claim 3, further comprising:

a second platform;

a second inflatable bladder for moving the second platform away from the platform during inflation of the second inflatable bladder; and third hinge members each having a first end pivotally connected to the platform and a second end pivotally connected to the second platform.

10. The linear translation device of claim 9, further comprising:

a valve assembly for inflating the second inflatable bladder.

11. The linear translation device of claim 10, wherein the valve assembly includes a valve member on a valve seat, a spring having a first end coupled to the valve member, a second end coupled to a support washer, a flexible diaphragm, and exhaust passages.

12. The linear translation device of claim 9, wherein the second platform has a wedge shaped portion on at least one of its sides.

13. The linear translation device of claim 9, wherein the third hinge members have the same length, and wherein the platform, second platform, and the third hinge members form a parallelogram structure producing relative translation between the platform and the second platform in a direction perpendicular to a lift direction of the second platform during inflation of the second bladder.

14. The linear translation device of claim 3, further comprising:

a second intermediate platform having an opening;

a second platform;

a second inflatable bladder between the platform and the second platform, the second inflatable bladder passing through the opening in the second intermediate platform for moving the second platform away from the platform during inflation of the second inflatable bladder;

at least one third hinge member having a first end pivotally connected to the platform and a second end pivotally connected to the second intermediate platform;

at least one fourth hinge member having a first end pivotally connected to the second platform and a second end pivotally connected to the second intermediate platform;

a third bracket member having a first end pivotally connected to the platform; and a fourth bracket member having a first end pivotally connected to the second platform and a second end pivotally connected to a second end of the third bracket member along a second bracket hinge axis in a plane substantially perpendicular to hinge axes of the pivotal connections of the third and fourth hinge members, the second bracket hinge axis being in the same plane as the second intermediate platform.

15. The linear translation device of claim 3, wherein the base includes a connector fluidly coupled to an interior of the inflatable bladder, the connector being capable of being connected to a source of fluid for inflating the bladder.

16. The linear translation device of claim 3, further comprising:

an exhaust valve;

a hose; and a flow director for directing an exhaust fluid passing through the exhaust valve to the inflatable bladder.

17. The linear translation device of claim 9, wherein the base includes a connector fluidly coupled to an interior of the inflatable bladder, the connector being capable of being connected to a source of fluid for inflating the bladder.

18. The linear translation device of claim 9, further comprising:

an exhaust valve;

a hose; and a flow director for directing an exhaust fluid passing through the exhaust valve to the inflatable bladder.

19. The linear translation device of claim 14, wherein the base includes a connector fluidly coupled to an interior of the inflatable bladder, the connector being capable of being connected to a source of fluid for inflating the bladder.

20. The linear translation device of claim 14, further comprising:

an exhaust valve;

a hose; and a flow director for directing an exhaust fluid passing through the exhaust valve to the inflatable bladder.

* * * * *